Inventors
R. H. Hall
D. M. McKim
by D R Morrison
Agent.

Patented May 30, 1950

2,509,431

UNITED STATES PATENT OFFICE 2,509,431

DISPENSING FLUIDIZED PULVERULENT MATERIALS

Ronald H. Hall and Douglas M. McKim, Shawinigan Falls, Quebec, Canada, assignors to Shawinigan Chemicals Limited, Montreal, Quebec, Canada, a corporation of the Dominion of Canada Application July 14, 1949, Serial No. 104,742

4 Claims. (Cl. 259—8)

This invention relates to the uniform dispensing of extremely finely divided materials, for example lime and lime hydrate in pulverulent form. It is the principal object of this invention to provide a process and apparatus for dispensing such materials at a uniform rate from a storage container or other receptacle to other apparatus for handling, treating, or modifying the same.

It has been disclosed by Goebels in U. S. P. 2,192,287, that numerous pulverulent and granular materials can be discharged at a uniform rate from a storage receptacle if the stored material is first suffused with air or other gaseous medium. The process of causing solid material to disperse in a fluid medium and to assume fluid properties has come to be known as fluidization. It is now known that certain powdery solids cannot be fluidized solely by suffusion with gas. In some cases this inability to undergo fluidization is due to excessive attrition or agglomeration. In many cases the reason for inability to undergo fluidization is unknown, while in some cases fluidization is impractical because the process produces so much dust of particles finer than 100 microns diameter that there is a dust nuisance and/or a health hazard. The process of this invention is of particular advantage in handling materials which come under the latter classification, but its application is not restricted thereto.

It has been found that pulverulent solid materials may be maintained in a fluidized state, with the addition thereto of volumes of gas insufficient to cause separation of dust particles larger than about one micron therefrom, by mechanically agitating the solid material while suffusing the gas thereinto. In some respects the effect produced does not appear to be true "fluidization," and terms such as "expanded" state and "state of quiescence" are sometimes applied to material in this condition. However, throughout the specification and claims, the term "fluidization" will be used to describe the process of suspending finely divided solids in a flowing gaseous medium.

The invention comprises a process for dispensing pulverulent materials from a storage container or other receptacle at a uniform rate, said process comprising charging pulverulent material to a suitable enclosure forming a fluidizing chamber, continuously suffusing air or other gaseous medium into the pulverulent material, simultaneously mechanically agitating the material to maintain it in a fluidized state of uniform density by combined mechanical agitation and suffusion with gas, and continuously discharging the fluidized material at a constant volume rate through suitable means associated with the chamber. The invention further comprises apparatus for dispensing pulverulent materials from a storage container or other receptacle at a uniform rate, said apparatus comprising means forming an enclosure from which pulverulent material may be discharged at a uniform rate to a point of utilization, means for charging the pulverulent material to the enclosure, means for suffusing air or other gaseous medium into the pulverulent material at the bottom of the enclosure, means for mechanically agitating the material suffused with gas to maintain the material in a fluidized state, and means for discharging the fluidized material from the enclosure.

A particular embodiment of the invention will now be described, with reference to the accompanying diagrammatic drawings in which.

Figure 1:
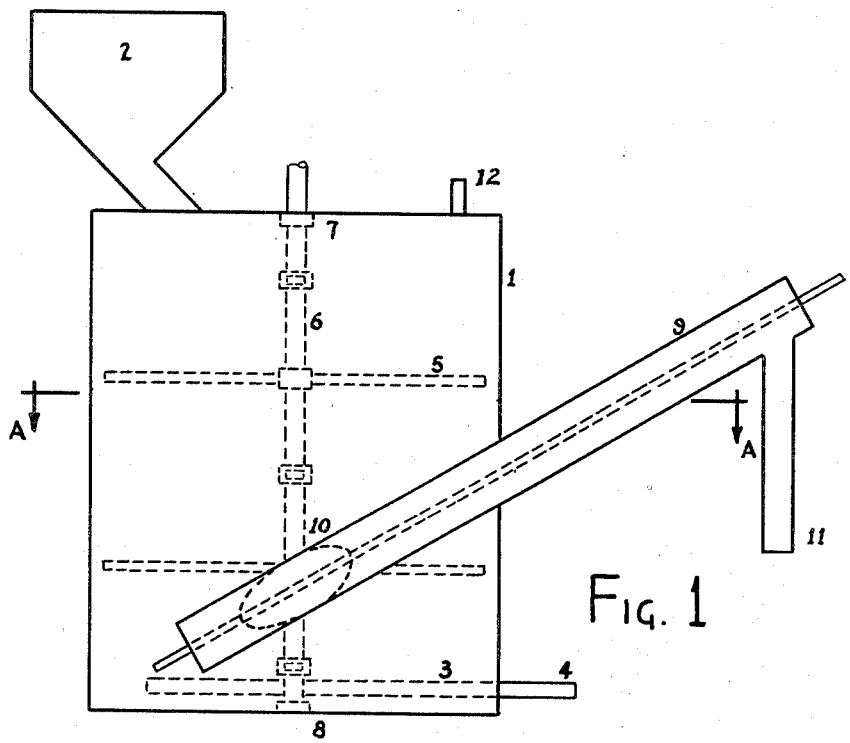
Fig. 1 is a vertical view, partly in section, of an apparatus for practising the invention.
Figure 2:
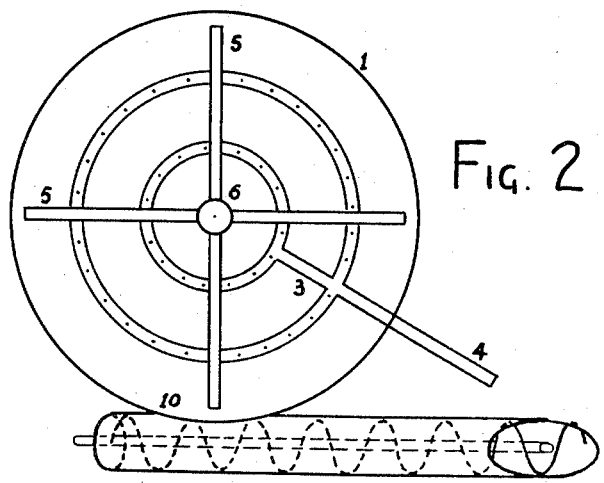
Fig. 2 is a cross-sectional view taken along the line A—A in Fig. 1.

In the drawings, 1 is a cylindrical fluidizing chamber, into which the material to be fluidized is charged from the simple hopper 2. An assembly of perforated pipe 3, arranged to distribute gas over the bottom of the chamber and connected to the gas supply 4, is used to suffuse the pulverulent material with gas, which finally escapes by vent 12. A series of rotating blades or paddles 5 is provided for the mechanical agitation of the material; they are mounted in pairs, alternately at right angles on a central shaft 6, mounted in bearings 7 and 8, and driven by means not shown. An opening 10 in the wall of the chamber communicates with an inclined screw conveyor 9, the flights of which are shown diagrammatically in Fig. 2 only. The conveyor is driven by a source of power not shown. By virtue of the fluid pressure of the fluidized pulverulent material in the chamber, the material flows uniformly through the opening 10 and is carried by the conveyor to the discharge 11 at a uniform rate. The inclination of the screw conveyor enables the conveyor to act as its own seal or valve so that fluidized material does not flow through it merely under pressure of the static head of fluidized material in the chamber.

A short description of the operation of the above described apparatus will serve to illustrate the operation of the process of this invention.

The finely divided pulverulent material which it is desired to dispense uniformly is charged to the fluidizing chamber 1, from storage through the hopper 2. The transfer of pulverulent material from storage to the fluidizing chamber must be such as to maintain the level in the fluidizing chamber within a reasonable range as long as it is desired to dispense the material uniformly, but this transfer does not need to be at a uniform rate; indeed it is not possible to transfer pulverulent materials at a uniform rate with ordinary mechanical devices, due to uneven packing of the material, and/or to "hanging up" or "bridging" which frequently occurs in pulverulent material when it is being worked. The pulverulent material is most conveniently charged to the fluidizing chamber at or near the top of the chamber. Air or other suitable gas is forced under pressure into the chamber at or near the bottom thereof. The gas is distributed over the cross-section of the chamber by admitting it through a porous plate in the bottom of the chamber or through a series of orifices distributed across the chamber at or near the bottom thereof, as shown at 3 in the drawing. Gas escapes from the chamber at the top thereof, for instance through a vent as at 12, when the chamber is covered; optionally the chamber need not be covered.

The stirring device located centrally in the chamber to provide mechanical agitation for the fluidized material therein is the novel feature of this particular embodiment of the invention. The stirring device illustrated in the drawing and having blades mounted conveniently at regular intervals along the central shaft, provides sufficient mechanical agitation, for the purposes of the invention, when rotating at unexpectedly low speeds; as an example, a speed of 20 R. P. M. was found suitable to maintain fluidity in one application, described later in this specification.

When the pulverulent material is of such a nature that suffusion with gas alone is not sufficient to maintain it in the fluidized state, the combined actions of suffusing material in the chamber with gas and mechanically agitating the suffused material serve to maintain it in a fluidized or expanded state. The effect of the mechanical agitation may readily be observed by discontinuing the agitation of a mass of pulverulent material that has been fluidized by combined agitation and suffusion with gas. The pulverulent material will then be observed to settle gradually to form a packed bed of material cleft by a relatively small number of channels through which the gas continues to pass from the bottom to the top of the bed. This effect is generally known as "chanelling." Mechanical agitation prevents the formation of such substantially vertical channels, and the suffusion with gas maintains the pulverulent material in the fluidized or expanded state, in which it has a uniform bulk density, flows readily like an fluid, and does not "pack" irregularly or "hang up."

When the pulverulent solid is in the fluidized or expanded state, it flows readily and uniformly out of the fluidizing chamber in a manner analogous to the flow of any liquid out of any enclosure. Thus the pulverulent material may be discharged from the fluidizing chamber in any one of numerous ways. The means illustrated in the drawing, which means has been found to be efficient and versatile, comprises withdrawing the pulverulent material in the flights of an inclined screw conveyor. This device provides a constant volume rate of displacement of material from the fluidized mass. Since the bulk density of the fluidizing material is independent of the depth of solids in the fluidizing chamber within a wide range of depths, it follows that the weight displacement rate is constant.

The discharge of solids by the screw conveyor may be above or below the level of the fluidized material in the chamber, and the rate of discharge may be varied by varying the speed of the screw conveyor.

The fluid pressure of a fluidized pulverulent material is constant at any point in a fluidizing chamber provided that the rate of gas feed to the chamber and the level of fluidized material in the chamber are fairly steady. The level of fluidized material in the chamber must, of course, be maintained by charging pulverulent material thereto as fluidized material is discharged. A constant fluid pressure in the fluidizing chamber provides a constant feed of pulverulent material of uniform density to any discharging means. The particular advantage of a uniform speed screw conveyor lies in the fact that, for a constant volume displacement of material from the fluidized mass, such as a screw conveyor provides, the weight displacement is constant regardless of the depth of fluidized material in the chamber, since the bulk density of the fluidized material is independent of the amount of solids in the fluidizing chamber. Thus the apparatus illustrated in the drawing is particularly capable of dispensing pulverulent material at a constant rate, since the level of fluidized material in the chamber may vary over a wider range, than that permissible in apparatus using other discharge means, without affecting the rate of discharge from the chamber.

As an appropriate example of the invention, a specific apparatus, which has been successfully operated, is hereunder described.

The elements of the apparatus were generally of the type illustrated in the drawing. The fluidizing chamber was a 10-gauge sheet steel cylindrical tank, six feet high and three feet in diameter, and was mounted on a suitable I-beam base. A metal chute, leading into the top of the tank and requiring manual loading, served as the means for charging pulverulent material to the tank. Air was admitted to the tank via a rotameter, through a coil-shaped sparger made of ½ inch standard pipe mounted six inches above the bottom of the tank. Air was dispersed from the sparger through twenty-four $\frac{1}{16}$ inch orifices in the pipe. A paddle agitator, driven by a ½ H.P. motor through a speed reducer at 20 R. P. M., served as the mechanical agitating means. The paddles were 1 inch by ¼ inch strip steel and were welded to a 1 inch central shaft, with alternate pairs of paddle on opposite sides of the shaft, mounted at right angles to each other at 6 inch intervals along the shaft. The discharging means on the apparatus was a single flight, 4-inch pitch, screw conveyor mounted in a small duct on the side of, and open to, the tank. The conveyor was 11 feet long and mounted at an angle of 30 degrees to the horizontal. It was driven at the lower end through a set of right-angle bevel gears connected by a chain and sprocket to a variable speed drive.

This apparatus was used to dispense a quantity of finely divided lime hydrate. The lime hydrate particles ranged in size from about 1 up to about 300 microns. 80% of a sample of the material would pass through a standard 200 mesh sieve (which has 74 micron openings). A series of runs was made, in which runs lime hydrate was charged to the tank by manually dumping quantities of hydrate down the charging chute, and lime hydrate was discharged from the tank at various rates by the screw conveyor, variations in the rate of discharge being obtained by varying either the rate of turning the screw conveyor or the rate of admission of air through the sparger. Suffusion of the lime hydrate with air was found to be inadequate to fluidize hydrate in the tank. The combination of suffusion with air and agitation by the paddle agitator rotating at about 20 R. P. M. was found to maintain hydrate in the tank in a fluidized or expanded state, in which state it could be uniformly discharged from the tank. The fluidized bed of hydrate had a depth of from five feet to six feet, usually close to five and one half feet.

A number of runs were made in which the level of fluidized hydrate was maintained by manual additions to the tank as air was admitted to the tank at a rate of 100 cu. ft./min. and hydrate discharged. The discharge rate of hydrate from the tank was determined with the screw conveyor turning at various speeds. The following table gives the discharge rates, in pounds per minute, obtained with a series of conveyor speeds.

| Conveyor Speed | Discharge Rate |
|---|---|
| R. P. M. | Lb./min. |
| 27 | 37 |
| 36.5 | 50 |
| 39.5 | 52.5 |
| 46.5 | 62.5 |
| 54 | 70 |
| 65 | 82.5 |

The importance of these runs lies in the fact that it was possible to maintain each of the above discharge rates constant to within about 1.3% for an indefinite period.

From the preceding descriptions it will be apparent that numerous modifications may be made in the specific expedients described. For instance, the means for uniformly discharging fluidized material from a fluidizing chamber could be a jet of air or other gas directed into a discharge conduit associated with the fluidizing chamber, as disclosed in the aforementioned Goebels patent. The means for mechanically agitating a pulverulent material could be one or more high-speed propellers turning in the fluidized bed. Such propellers would require more power than a slow-turning agitator, but would enable smaller volumes of gas to be used for suffusing the material. The mechanical agitating means might also be a group of slow speed stirrers, mounted on individual axes of rotation, turning in cooperation to prevent channelling and maintain fluidization of the bed.

Numerous advantages of the invention will be apparent to those dealing with the problem of materials handling. One of the main advantages has been the provision of a constant rate of feed of pulverulent lime hydrate to a pressing or briquetting machine. Such machines operating at constant speed require a constant feed of pulverulent lime hydrate to produce briquets of uniform density. Other advantages will be apparent to those skilled in the art.

What we claim is:

1. Apparatus for uniformly dispensing a pulverulent solid material comprising (1) means forming an enclosure from which the pulverulent material may be discharged at a uniform rate, (2) means for charging pulverulent material to the enclosure, (3) means for suffusing a gaseous medium into the pulverulent material at the bottom of the enclosure, (4) means for mechanically agitating the material suffused with gas to maintain the material in a fluidized state, (5) and screw conveyor means for discharging the fluidized material from the enclosure, said conveyer means being in open contact with fluidized material in the enclosure above the means for suffusing the gaseous medium.

2. Apparatus as claimed in claim 1, in which the means for mechanically agitating the pulverulent material is a stirring device.

3. Apparatus as claim in claim 1, in which the means for mechanically agitating the pulverulent material is a set of stirrers turning on individual axes of rotation.

4. Apparatus, as claimed in claim 1, in which the screw conveyor means is arranged to elevate and discharge material from the enclosure at a level above the level of fluidized material in the enclosure.

RONALD H. HALL.
DOUGLAS M. McKIM.

REFERENCES CITED

The following references are of record in the file of this patent:

UNITED STATES PATENTS

| Number | Name | Date |
|---|---|---|
| 525,095 | Detwiler | Aug. 28, 1894 |
| 1,616,547 | Pontoppidan | Feb. 8, 1927 |
| 1,839,456 | Anderson | Jan. 5, 1932 |